US008662548B1

(12) United States Patent
Viani

(10) Patent No.: US 8,662,548 B1
(45) Date of Patent: Mar. 4, 2014

(54) MULTIFUNCTION LAWN AND GARDEN DEVICE

(71) Applicant: Thomas Viani, Orlando, FL (US)

(72) Inventor: Thomas Viani, Orlando, FL (US)

( * ) Notice: Subject to any disclaimer, the term of this patent is extended or adjusted under 35 U.S.C. 154(b) by 0 days.

(21) Appl. No.: 13/758,275

(22) Filed: Feb. 4, 2013

(51) Int. Cl.
*A01B 1/20* (2006.01)
*A01B 1/22* (2006.01)
*A01D 9/00* (2006.01)
*A01D 11/00* (2006.01)

(52) U.S. Cl.
USPC ............... 294/51; 294/176; 294/57; 294/59; 209/418; 15/257.1

(58) Field of Classification Search
USPC ......... 294/1.3, 49, 51, 54.5, 57, 59; 15/257.1, 15/257.2, 257.7; 209/417–419; D8/10; D30/162; D32/74; 119/161, 165, 166
See application file for complete search history.

(56) References Cited

U.S. PATENT DOCUMENTS

| 902,954 A | * | 11/1908 | Felty | 209/419 |
| D360,714 S | * | 7/1995 | d'Alquen | D30/162 |
| 5,738,399 A | * | 4/1998 | Mitchell | 294/1.3 |
| 6,416,097 B1 | * | 7/2002 | O'Rourke | 294/179 |
| 2009/0140536 A1 | * | 6/2009 | Claypool et al. | 294/55 |

* cited by examiner

*Primary Examiner* — Stephen Vu
(74) *Attorney, Agent, or Firm* — Daniel Law Offices, P.A.; Jason T. Daniel, Esq.

(57) ABSTRACT

A multifunction lawn and garden device includes a generally flat base member having a plurality of upward radiating walls extending therefrom. A slanted edge is disposed along the front side of the base member, and an aperture is formed within the center of the base member. A generally T-shaped handle is positioned above the center of the base member and is secured to each of the back and side walls, and a removable insert member having a complementary shape as the aperture is provided.

18 Claims, 5 Drawing Sheets

MULTIFUNCTION LAWN AND GARDEN DEVICE

TECHNICAL FIELD

The present invention relates generally to lawn and garden tools, and more particularly to a multifunction lawn and garden device.

BACKGROUND

The statements in this section merely provide background information related to the present disclosure and may not constitute prior art.

As any gardener will attest, having the right tool for the right job makes all the difference in the world. To this end, consumers often fill their sheds and garages with items such as dustpans for picking up dust or debris; buckets for carrying tools, plants and vegetables from one location to another; and garden sifters for picking up and separating coarse and fine particles.

While these devices work independently to fulfill their respective objectives, their use requires a user to purchase, store and then carry a plurality of different tools to the site where they are needed. Accordingly, it would be beneficial to provide a single integrated device capable of performing a plurality of functions that does not suffer from the above noted drawbacks.

SUMMARY OF THE INVENTION

The present invention is directed to multifunction lawn and garden device. One embodiment of the invention can include a generally flat base member having a plurality of upward radiating walls extending therefrom. A slanted edge is disposed along the front side of the base member and acts as a ramp for receiving debris. An aperture is formed within the base member and can receive one or more removable insert members having either a flat surface or a plurality of sifting elements disposed therein. A generally T-shaped ergonomically friendly handle is positioned above the center of the base member and is secured to each of the back and side walls.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
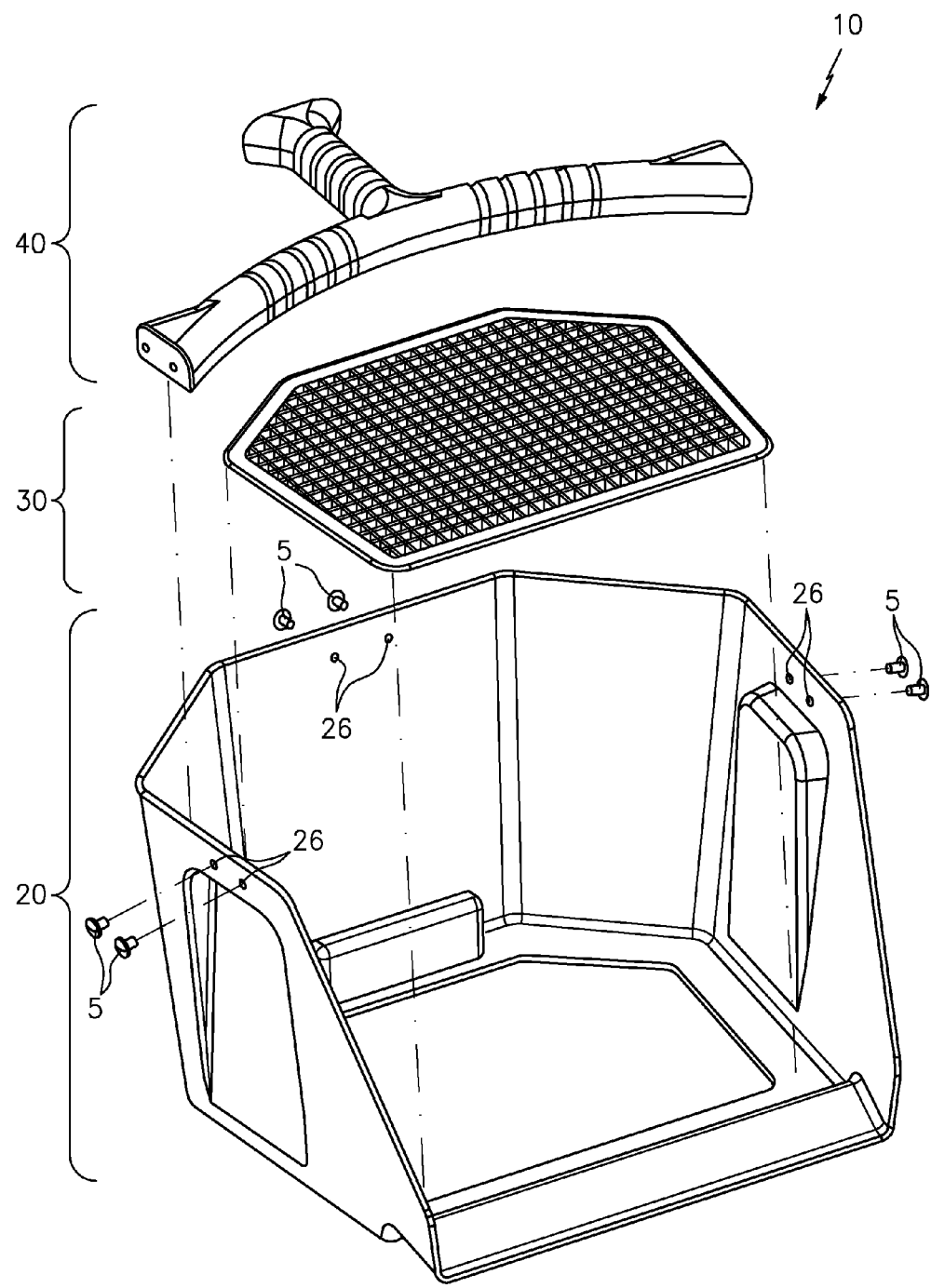
FIG. 1 is an exploded parts view of the multifunction lawn and garden device that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1. Although described as individual elements and as a single device with a removable insert, other embodiments such as a kit, are contemplated wherein the device and a plurality of removable inserts are provided.

FIG. 1 is an exploded parts view of a multifunction lawn and garden device in accordance with one embodiment of the invention. As shown, the device 10 can include, essentially, a main body 20, a removable insert member 30, and a multi-grip handle 40. As described above, the multifunction device described herein can function to replace multiple conventional lawn and garden tools with one device.

Now that one embodiment of the overall concept has been identified, the following description will be directed to the various components of the multipurpose device in accordance with the one embodiment. Although described below as including specific materials and/or construction methodologies, this is for illustrative purposes only, as those of skill in the art will recognize that many other materials and methods can also be utilized without undue experimentation.

Figure 2B:
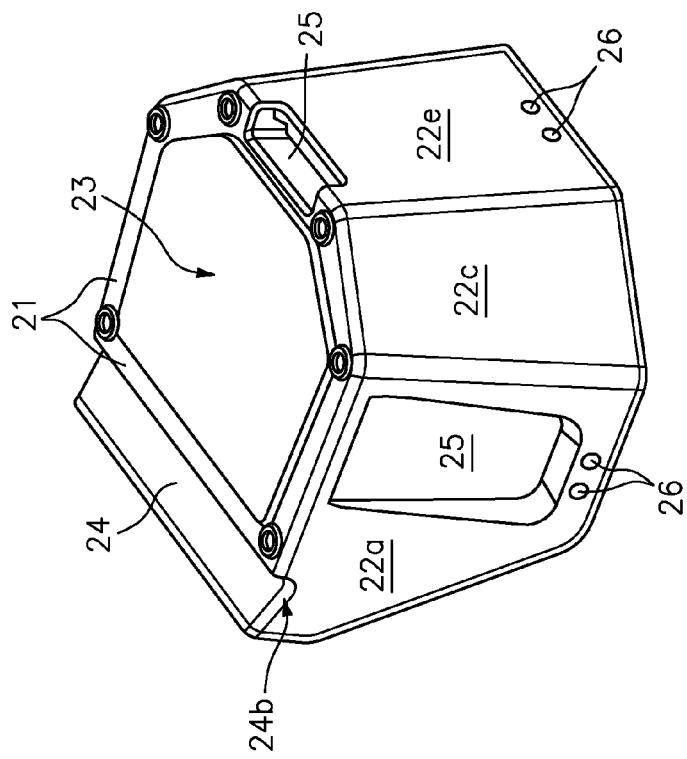
FIG. 2b is a bottom perspective view of the main body of the multifunction lawn and garden device, in accordance with one embodiment of the invention.
Figure 2A:
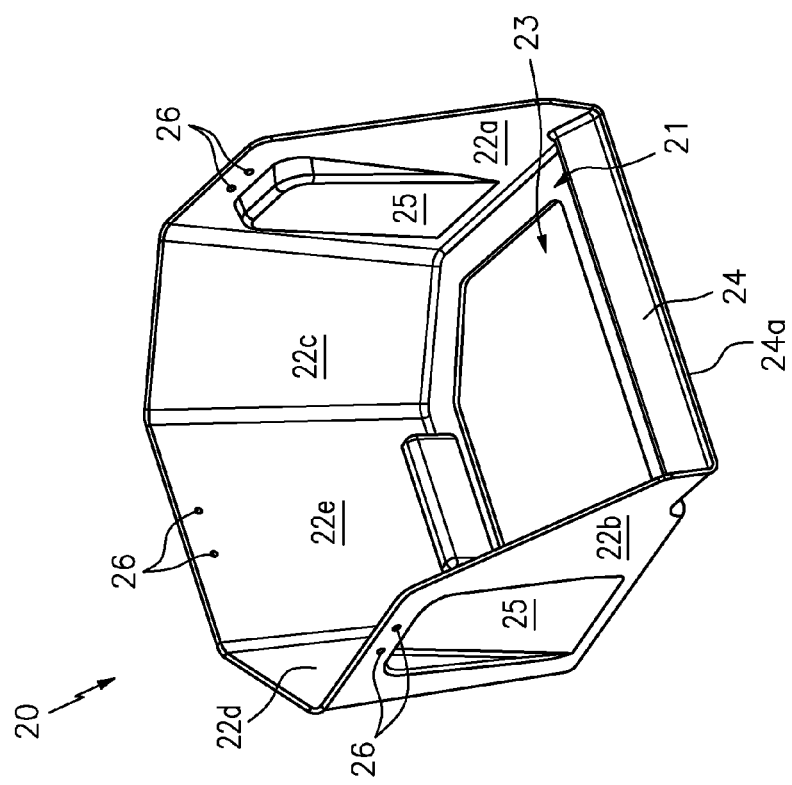
FIG. 2a is a front side perspective view of the main body of the multifunction lawn and garden device, in accordance with one embodiment of the invention.

FIGS. 2a and 2b illustrate one embodiment of the main body 20 that includes a generally flat base member 21 having a pair of opposing and vertically extending side walls 22a and 22b, transition side walls 22c and 22d, and rear wall 22e. In one preferred embodiment, the base member 21 can include a generally irregular hexagonal shape having a smaller end positioned below the rear wall, and a larger end positioned opposite to the rear wall. Of course, other embodiments are contemplated wherein the base member and/or any of the walls can include a different shape.

An aperture 23 is disposed within the base member 21. As shown, aperture 23 includes a shape that is complementary to the shape of the base member and can preferably be offset from each of the side walls 22a-22e by an equal distance. As will be described below, the aperture 23 acts to receive a portion of the removable insert 30 in order to impart additional functionality to the device.

A slanted edge 24 is disposed across the front portion of the base member 21 and extends between the side walls 22a and 22b. Edge 24 acting to provide structural support to the base member and including a front portion 24a which acts as a ramp for receiving debris and other such material. As shown, the back portion of the slanted edge 24b extends upward from the base member to act as a debris trap for preventing any deposited material from escaping. A plurality of bump stops 26 can be disposed along the bottom surface of the base member 21. Bump stops acting in a conventional manner to provide traction to the ground when in contact with the same, and to ensure the device is level.

In one embodiment, each of the opposing side walls 22a and 22b can include an elongated inward radiating recess 25a which can act in unison to form secondary handles, which can be useful when utilizing the device as a sifter, for example. Likewise, the back wall 22e can also include an inward radiating recess 25b which can be useful when tipping or emptying the device. A plurality of through holes 26 can be located on each of the side and back walls at locations above the recesses 25a and 25b. Through holes 26 having a size and location suitable for receiving conventional hardware 5, such as binder head screws, for example, to secure the handle 40 to the device.

In one preferred embodiment, the main body 20 can be constructed from a single mold of injected plastic having a shape and dimension as described herein. While the dimensions of the elements are not critical, in the preferred embodiment the main body 20 has a length (e.g., 24-22e) of approximately 19 inches, a width (e.g., 22a-22b) of approximately 23 inches, and a depth (e.g., vertical height of elements 22a-22e) of approximately 12 inches.

Although described above as including particular dimensions, recesses at specific locations and a hexagonal base shape, this is for illustrative purposes only, as those of skill in the art will recognize that any number of other shapes, sizes, materials and/or construction methodologies can also be utilized without deviating from the scope and spirit of the inventive concepts disclosed herein. Additionally, aperture 23 need not include a shape that is similar to the shape of the base member 21.

Figure 3A:
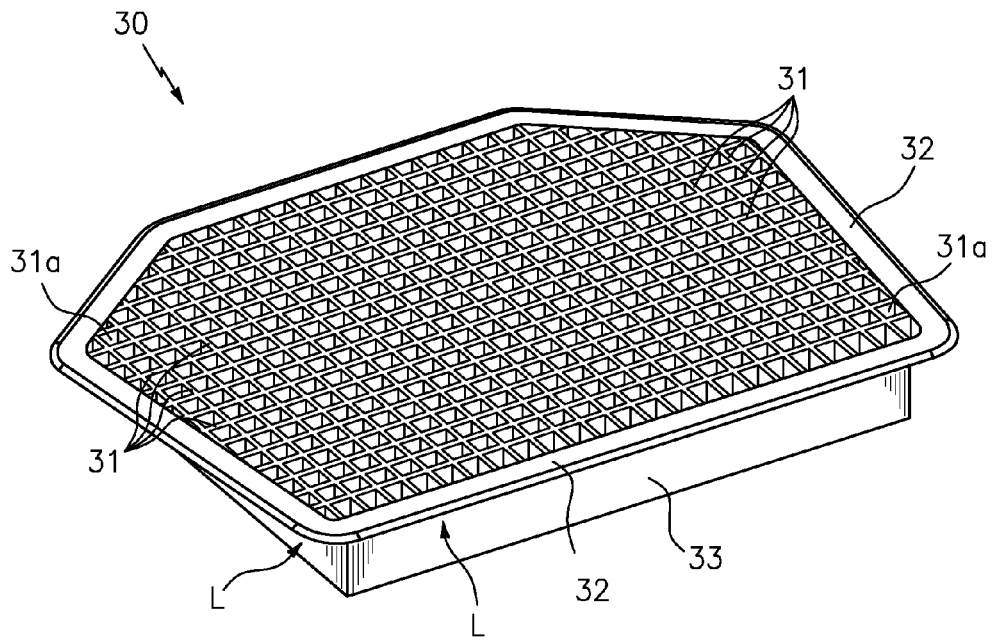
FIG. 3a is a top perspective view of a removable insert of the multifunction lawn and garden device, in accordance with one embodiment of the invention.
Figure 3B:
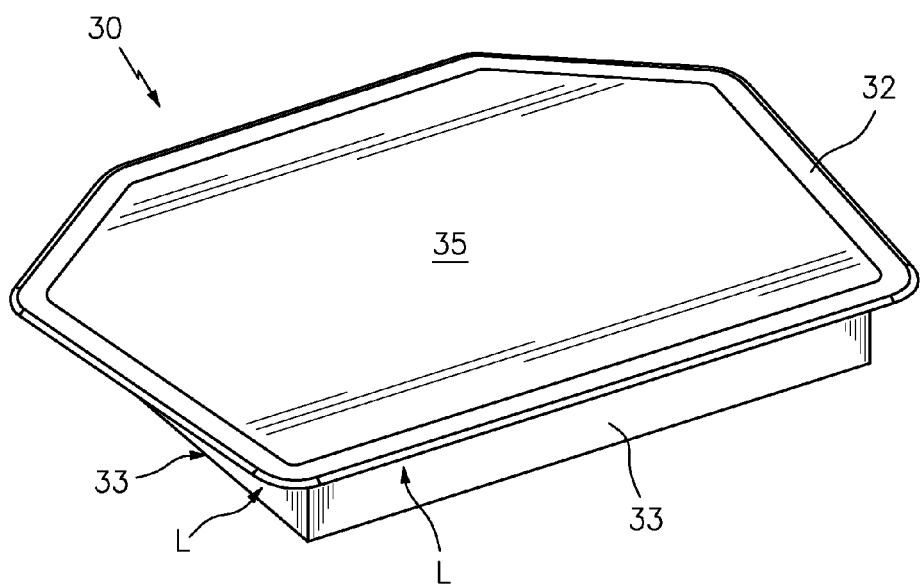
FIG. 3b is a top perspective view of a removable insert of the multifunction lawn and garden device, in accordance with another embodiment of the invention.

FIGS. 3a and 3b illustrate various embodiments of a removable insert member 30. As shown, insert 30 can include a grid of narrow cross mounted and/or overlapping sifting elements 31 that are bounded on each side by an outer lip 32. Sifting elements 31 forming a lattice-like network of obstacles and openings 31a for separating coarse and fine particles. In one embodiment, a protrusion 33 is disposed along the bottom surface of the outer lip 32 at a location that is adjacent to the sifting elements 31. The protrusion 33 having a shape and dimension that is complementary to the shape and dimension of the base member aperture 23 so as to be inserted therein. When so located, the overlapping portion L of the lip 32 can rest atop the base member 21.

In one preferred embodiment, the entire insert member 30 can be constructed from a single mold of injected plastic wherein each of the openings 31a can include a dimension of approximately ¼ inch. Of course, this is for illustrative purposes only, as the removable insert member 30 can include a grid structure of different and/or varying sized openings ranging from approximately 1/32 inches to 1 inch, for example. Additionally, although described as a protrusion 33, other embodiments are also contemplated. For example, in one alternate embodiment, the sifting elements 31 can include a depth that is greater than the frame 32, thereby inherently forming a protrusion which can serve the same purpose as the above described protrusion 33 so as to be directly inserted into, and retained within the base aperture 23.

FIG. 3b illustrates an alternate embodiment of the removable insert 30 that does not include the plurality of sifting elements 31 and/or openings 31a. To this end, the insert 30 can include a solid, one piece surface 35 that includes the protrusion 33 forming a lip L, as described above. When secured within aperture 23, such a feature can function to transform the device 10 from a sifter to a sturdy device capable of carrying large and small items alike.

In another alternate embodiment, the removable insert 30 can include a plurality of different sized openings. As shown best in FIG. 4a, larger sized openings 31a1 can be disposed within the insert 30 at a location near the leading edge 24 of the main body, and smaller sized openings 31a2 can be disposed near the rear wall 22e of the main body. Such a feature can allow the assembled device 10 to function as an extremely effective sifter, for example.

Figure 4A:
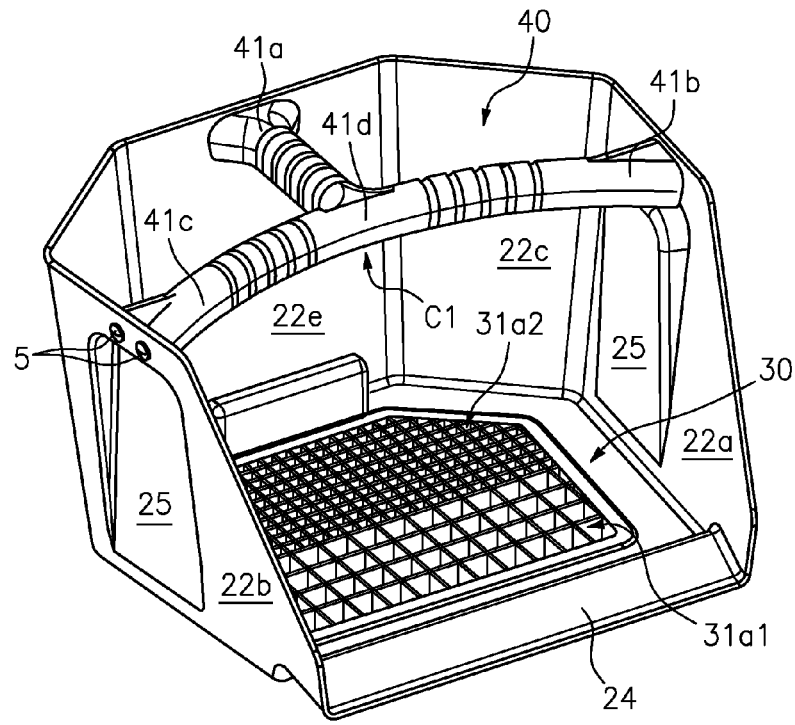
FIG. 4a is a top perspective view of an assembled multifunction lawn and garden device, in accordance with one embodiment of the invention.
Figure 4B:
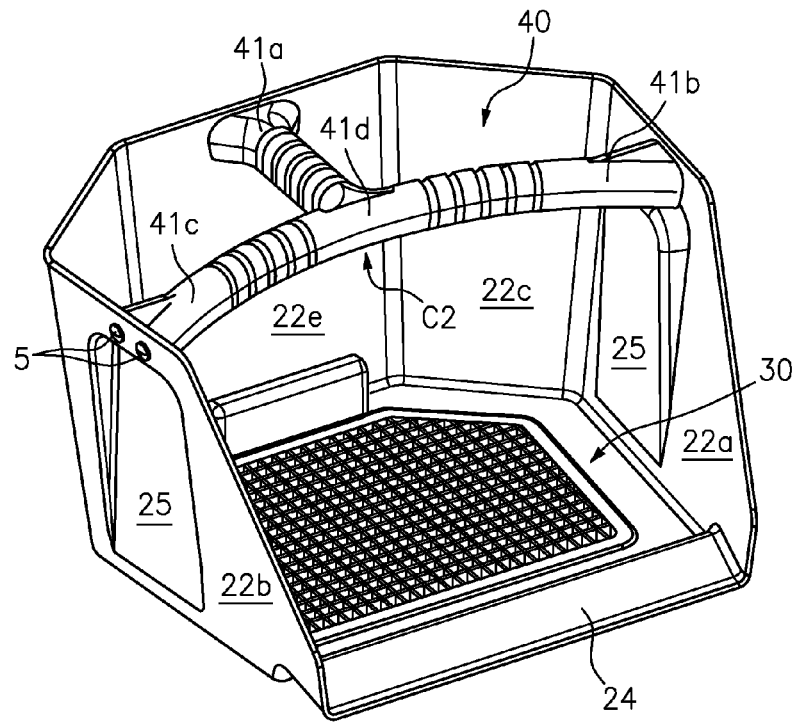
FIG. 4b is another top perspective view of an assembled multifunction lawn and garden device, in accordance with one embodiment of the invention.

FIGS. 4a and 4b illustrate one embodiment of the device 10 with the handle 40 attached. The handle 40 can include three segments 41a, 41b and 41c that are connected to the back wall 22e, and the opposing side walls 22a and 22b, respectively. These segments meet at a central section 41d which is positioned above the center of the base member 21.

As shown, segments 41b and 41c can include a generally curved design C1 and C2, wherein C1 represents a horizontal curve radiating inward from the front section of the main body, and C2 represents a vertical curve radiating upward from side walls 22a and 22b. Each of these curves acting to provide additional functionality to the device. More specifically, curve C1 orients the handle segments 41b and 41c so that when the device is being used with a conventional rake, the backward sweeping design of the handle segments provides additional clearance for the rake handle. In other words, a user standing behind the device 10 using a rake, can more easily pull debris into the main body without hitting the handle segments themselves. Moreover, vertical curve C2 acts to provide a more ergonomically friendly angle to each of the segments 41a-41c so as to prevent the hand of a user carrying the device from being strained at an unnatural angle (See FIGS. 5a-5c).

A plurality of rubberized gripping elements 42 can be disposed along the surface of the handle at one or more locations. Gripping elements functioning in a conventional manner to provide a greater coefficient of friction between the handle 40 and a user's hand. Of course, other means for providing additional grip to the handle are also contemplated. For example, one or more segments of the handle can be coated with any form of gripping material such as nylon, for example, or the surface of the handle itself can include a rough construction that inherently provides additional grip, when compared to a smooth surface. These and other forms of increasing grip to a handle are well known in the art; therefore, no further explanation will be provided.

In one preferred embodiment, the handle 40 can be constructed from a single mold of injected plastic, and each segment 41a-41c can be secured to the main body 20 by a pair of binder head screws 5 that traverse the through holes 26. Of course, this is for illustrative purposes only, as the handle can be constructed from any number of different materials, and can be secured to the main body via any number of known conventional mounting hardware such as screws, bolts and other such compression fittings, for example.

Figure 5A:
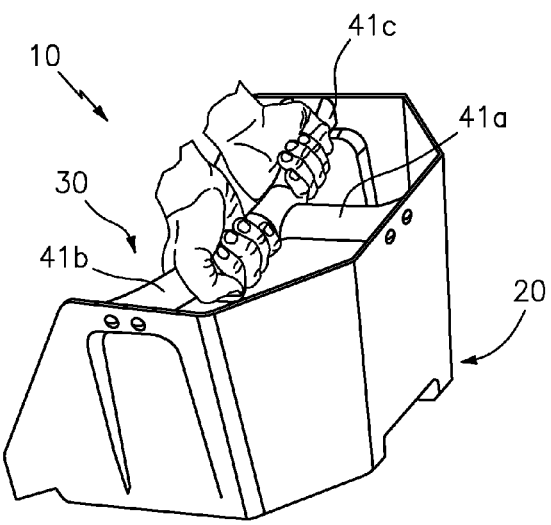
FIGS. 5a-5c illustrate the multifunction lawn and garden device in operation, in accordance with one embodiment of the invention.

FIGS. 5a-5d illustrate the multifunction lawn and garden device 10 in operation. As shown in FIG. 5a, by providing a multi sided handle 40, a user 1 can carry the device using only the rear segment 41a when transporting light loads contained within the main body 20. However, by positioning the handle 40 directly above the center of the base member 21, the device can also allow a user to carry extremely heavy items within the main body using the handle segments 41b and 41c.

Figure 5B:
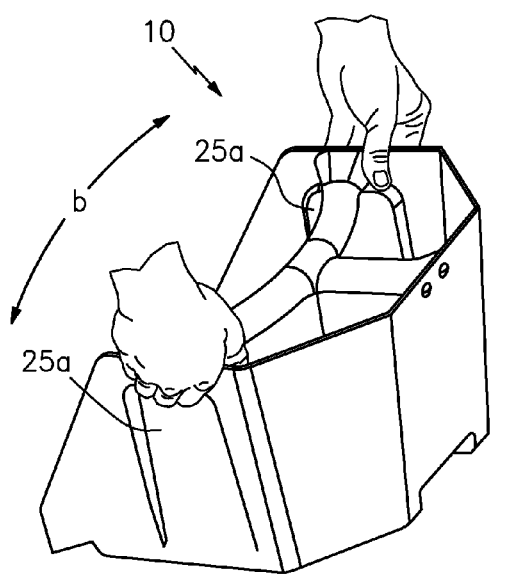
Figure 5C:
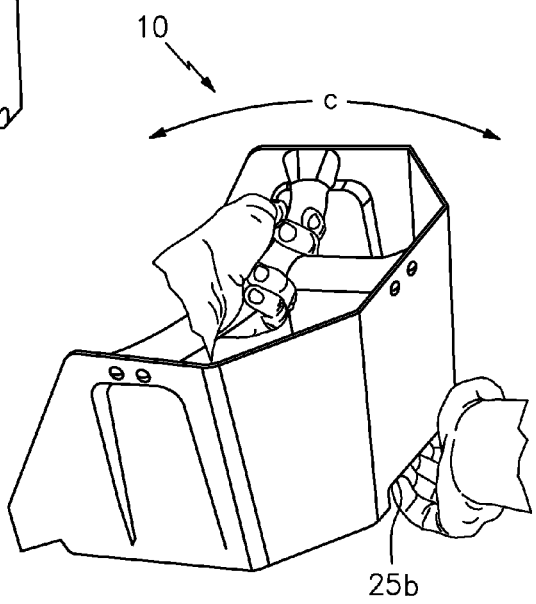

In addition to the above, recesses 25a can act to increase the functionality of the device. As shown in FIG. 5b, when the removable insert 30 having the sifting grid 31 is installed, the user can easily agitate (See arrow b) the entire device using the side protrusions 25a. Finally, as shown in FIG. 5c, when used as a dustpan, the combination of the handle 40 and the rear recess 25b can facilitate easy tipping, scooping, and/or pouring operations (See arrow c2).

Accordingly, the multifunction lawn and garden device 10 can function as a sifter, a dustpan and a carrying receptacle in a novel manner without requiring a user to obtain, store and carry three separated tools for a single project.

As described herein, one or more elements of the multifunction lawn and garden device 10 can be secured together utilizing any number of known attachment means such as, for example, screws, glue, compression fittings and welds, among others. Moreover, although each of the above embodiments have been described as including separate individual elements, the inventive concepts disclosed herein are not so limiting. To this end, one of skill in the art will recognize that each of the individual elements such as the main body 20 and the handle 40, including all subcomponents, can be formed as single continuous elements, either through manufacturing processes, such as welding, casting, or molding, or through the use of singular pieces of material milled or machined with each of the aforementioned components forming identifiable sections thereof. Additionally, although described above as being preferably constructed from plastic, other construction materials such as metal, PVC and wood, for example can also be utilized herein. Finally, it is noted that one or more portions of the device can be constructed from the same, or different materials, each forming the identifiable sections described above.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A multifunction lawn and garden device, comprising:
   a main body that includes
      a generally planar, nonporous base member having a slanted edge disposed along a first end,
      a plurality of upward radiating walls secured to the base member at a generally orthogonal manner, said walls including a pair of opposing side walls and a rear wall each disposed along an outer periphery of the base member, said rear wall being secured to the base member along a second end that is opposite to the first end, and
      an aperture disposed within base member, said aperture having a first shape;
   a handle that includes
      a generally T-shaped member having a first section that is in communication with the rear wall, and a second and third section that are in communication with the opposing side walls, respectively,
      said handle further including a central section that is positioned above a center portion of the base member; and
   a removable insert member that includes
      an outer lip that is configured to be in communication with an upper surface of the base member, and
      a protrusion secured to a lower surface of the outer lip, said protrusion having a shape that is complementary to the shape of the base member aperture and is configured to be positioned therein.

2. The device of claim 1, further comprising:
   a plurality of sifting elements and openings disposed within the removable insert, said sifting elements and openings being bounded on all sides by at least one of the lower protrusion and the outer lip.

3. The device of claim 2, wherein each of the openings include a dimension of between 1/32 inches and 1 inch.

4. The device of claim 2, wherein each of the openings of the removable insert include an identical dimension.

5. The device of claim 2, wherein at least one of the plurality of openings includes a dimension that is different from another of the plurality of openings.

6. The device of claim 1, wherein the removable insert includes a solid surface that is bounded on all sides by at least one of the lower protrusion and the outer lip.

7. The device of claim 1, wherein the handle includes an upward radiating curve configured to provide an ergonomically friendly surface, and a rearward radiating curve configured to provide additional clearance for a rake handle.

8. The device of claim 1, wherein the base member includes a generally irregular hexagonal shape, and the first end includes a length that is greater than a length of the second end.

9. The device of claim 1, wherein the aperture includes an irregular hexagonal shape that is positioned an equal distance from each of the plurality of walls.

10. The device of claim 1, wherein the edge includes a slanted front portion configured to receive debris, and a vertical rear portion configured to function as a debris trap.

11. The device of claim 1, wherein each of the back wall and the opposing side walls include an elongated inward radiating recess configured to act as secondary handles.

12. The device of claim 1, wherein the main body includes a length of approximately 19 inches, a width of approximately 23 inches and a depth of approximately 12 inches.

13. The device of claim 1, wherein the handle further includes a plurality of gripping elements.

14. The device of claim 1, wherein the handle is removably secured to the main body.

15. A multifunction lawn and garden kit, comprising:
   a main body that includes
      a generally planar, nonporous base member having a slanted edge disposed along a first end,
      a plurality of upward radiating walls secured to the base member at a generally orthogonal manner, said walls including a pair of opposing side walls and a rear wall each disposed along an outer periphery of the base member, said rear wall being secured to the base member along a second end that is opposite to the first end, and
      an aperture disposed within base member, said aperture having a first shape;
   a handle that includes
      a generally T-shaped member having a first section that is in communication with the rear wall, and a second and third section that are in communication with the opposing side walls, respectively,
      said handle further including a central section that is positioned above a center portion of the base member;
   a first removable insert member that includes
      an outer lip that is configured to be in communication with an upper surface of the base member,
      a protrusion secured to a lower surface of the outer lip, said protrusion having a shape that is complementary to the shape of the base member aperture and is configured to be positioned therein, and
      a plurality of sifting elements and openings that are bounded on all sides by at least one of the lower protrusion and the outer lip; and
   a second removable insert member that includes
      a solid surface including an outer lip that is configured to be in communication with an upper surface of the base member, and
      a protrusion secured to a lower surface of the outer lip, said protrusion having a shape that is complementary to the shape of the base member aperture and is configured to be positioned therein.

16. The device of claim 15, wherein each of the openings of the first removable insert member include a dimension of between 1/32 inches and 1 inch.

17. The device of claim 15, wherein each of the openings of the first removable insert member include an identical dimension.

18. The device of claim 15, wherein at least one of the plurality of openings of the first removable insert member includes a dimension that is different from another of the plurality of openings.

* * * * *